(12) United States Patent
Tan et al.

(10) Patent No.: US 12,236,019 B2
(45) Date of Patent: Feb. 25, 2025

(54) POINTING METHOD AND POINTING DEVICE

(71) Applicant: PixArt Imaging Inc., Hsin-Chu (TW)

(72) Inventors: Zi Hao Tan, Penang (MY); Joon Chok Lee, Penang (MY); Kevin Len-Li Lim, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 18/207,691

(22) Filed: Jun. 9, 2023

(65) Prior Publication Data

US 2024/0411382 A1 Dec. 12, 2024

(51) Int. Cl.
*G06F 3/0354* (2013.01)
*G06F 3/03* (2006.01)
*G06F 3/038* (2013.01)
*G06F 3/041* (2006.01)

(52) U.S. Cl.
CPC ........ *G06F 3/0304* (2013.01); *G06F 3/03543* (2013.01); *G06F 3/0383* (2013.01); *G06F 3/0418* (2013.01)

(58) Field of Classification Search
CPC .. G06F 3/0304; G06F 3/03543; G06F 3/0383; G06F 3/0418; G06F 3/0354; G06F 3/033; G06F 3/04182
See application file for complete search history.

(56) References Cited

U.S. PATENT DOCUMENTS

| | | | |
|---|---|---|---|
| 2011/0150363 A1* | 6/2011 | Chen | G06F 3/0317 382/291 |
| 2014/0092019 A1* | 4/2014 | Chen | G06F 3/0317 345/163 |
| 2015/0009172 A1* | 1/2015 | Su | G06F 3/0418 345/174 |
| 2019/0128821 A1* | 5/2019 | Yang | G06F 3/0383 |

* cited by examiner

*Primary Examiner* — Julie Anne Watko
(74) *Attorney, Agent, or Firm* — Winston Hsu

(57) ABSTRACT

A pointing method, applied to a pointing device comprising a processing circuit, comprising: (a) receiving input delta by the processing circuit, wherein the input delta indicates supposed movement of the pointing device; (b) adjusting the input delta to generate output delta by the processing circuit, wherein the input delta has a first magnitude and the output delta has a second magnitude, wherein the second magnitude is smaller than or equal to the first magnitude; and (c) output the output delta by the processing circuit.

16 Claims, 9 Drawing Sheets

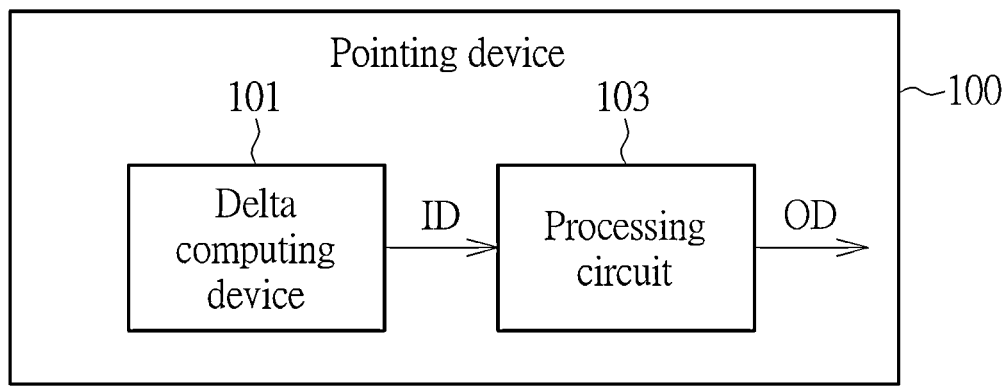
FIG. 1
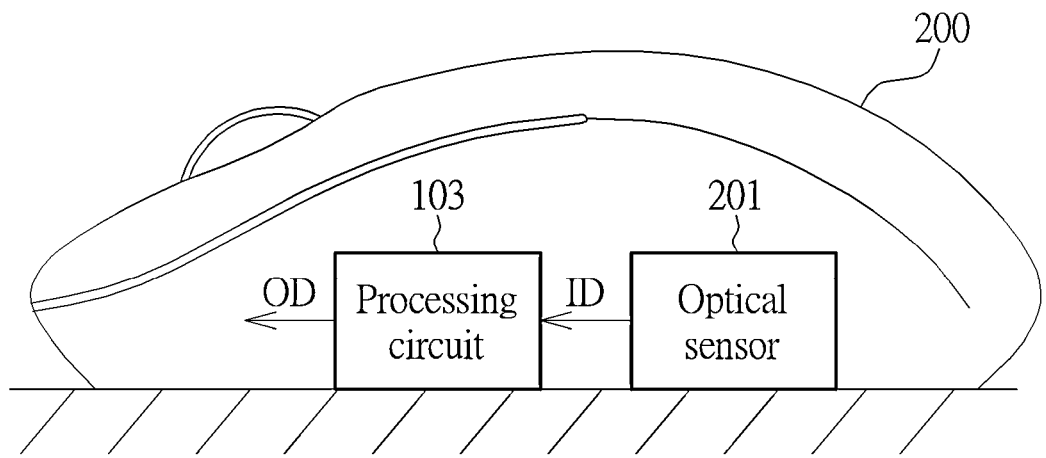
FIG. 2
FIG. 3

| Frame | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| Last output sign | + | + | + | + | + | + | + | + | + | + | + | + | + | + | + | + | + | + | + | + | + |
| Input delta | 0 | 2 | 2 | 3 | 1 | -1 | 1 | -1 | 2 | -1 | 2 | -1 | 2 | -2 | 2 | -2 | 2 | -2 | 2 | -2 | 2 |
| ACV before output | 0 | 2 | 2 | 3 | 1 | -1 | 0 | -1 | 1 | -1 | 1 | -1 | 1 | -2 | 0 | -2 | 0 | -2 | 0 | -2 | 0 |
| Output delta | 0 | 2 | 2 | 3 | 1 | 0 | 0 | 0 | 1 | 0 | 1 | 0 | 1 | 0 | 0 | 0 | 0 | 0 | 0 | 0 | 0 |
| ACV after output | 0 | 0 | 0 | 0 | 0 | -1 | 0 | -1 | 0 | -1 | 0 | -1 | 0 | -2 | 0 | -2 | 0 | -2 | 0 | -2 | 0 |

FIG. 4

| Frame | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| Last output sign | + | + | + | + | + | + | + | + | + | + | + | + | - | - | - | - | - | - | - | - | - |
| Input delta | 0 | 1 | 1 | 2 | 1 | -1 | 1 | -1 | 2 | -1 | -1 | -2 | 1 | 2 | -1 | -1 | -1 | -1 | -1 | 1 | -1 |
| ACV before output | 0 | 0 | 1 | 2 | 1 | -1 | 0 | -1 | 1 | -1 | -2 | -4 | 1 | 3 | 2 | 1 | 0 | -1 | -1 | 1 | 0 |
| Output delta | 0 | 0 | 0 | 0 | 1 | 0 | 0 | 0 | 1 | 0 | 0 | -1 | 0 | 0 | 0 | 0 | 0 | -1 | -1 | 0 | 0 |
| ACV after output | 0 | 0 | 0 | 0 | 0 | -1 | 0 | -1 | 0 | -1 | -2 | 0 | 1 | 3 | 2 | 1 | 0 | 0 | 0 | 1 | 0 |

FIG. 6A

| Frame | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| Last output sign | + | + | + | + | + | + | + | + | + | + | + | + | - | + | - | + | + | + | - | - | + |
| Input delta | 0 | 0 | 1 | 2 | 1 | -1 | 1 | -1 | 2 | -1 | -1 | -2 | 4 | -5 | 5 | 4 | 3 | -4 | -3 | 4 | 3 |
| ACV before output | 0 | 0 | 1 | 2 | 1 | -1 | 0 | -1 | 1 | -1 | -2 | -4 | 4 | -5 | 5 | 4 | 3 | -4 | -3 | 4 | 3 |
| Output delta | 0 | 0 | 0 | 0 | 1 | 0 | 0 | 0 | 1 | 0 | 0 | -1 | 1 | -2 | 2 | 4 | 3 | -1 | -3 | 1 | 3 |
| ACV after output | 0 | 0 | 0 | 0 | 0 | -1 | 0 | -1 | 0 | -1 | -2 | 0 | 0 | 0 | 0 | 0 | 0 | 0 | 0 | 0 | 0 |

FIG. 6B

POINTING METHOD AND POINTING DEVICE

BACKGROUND OF THE INVENTION

1. Field of the Invention

The present invention relates to a pointing method and a pointing device, and particularly relates to a pointing method and a pointing device which can compensate jitters.

2. Description of the Prior Art

For an optical sensor of an optical mouse, noise from a digital circuit/analog circuit, or from external factors such as power supply/surface illumination may cause jitters in motion output. Jitters are undesirable for the user since it affect the accuracy of the cursor placement, especially when the optical mouse is stationary. For example, when jitters occur, the cursor may move back and forth in the X direction or the Y direction on a screen, making it difficult for the user to hit the target. An optical sensor with jitters also cause higher power consumption for a system such as a laptop, since the system is unable to go into a sleep mode when not in used.

SUMMARY OF THE INVENTION

One objective of the present invention is to provide a pointing method which can automatically compensate jitters.

Another objective of the present invention is to provide a pointing device which can automatically compensate jitters.

One embodiment of the present invention discloses a pointing method, applied to a pointing device comprising a processing circuit, comprising: (a) receiving input delta by the processing circuit, wherein the input delta indicates supposed movement of the pointing device; (b) adjusting the input delta to generate output delta by the processing circuit, wherein the input delta has a first magnitude and the output delta has a second magnitude, wherein the second magnitude is smaller than or equal to the first magnitude; and (c) output the output delta by the processing circuit.

Another embodiment of the present invention discloses a pointing device, comprising: a delta computing device, configured to generate input delta, wherein the input delta indicates supposed movement of the pointing device; and a processing circuit. The processing circuit is configured to perform following steps: (a) receiving the input delta from the delta computing device; (b) adjusting the input delta to generate output delta by the processing circuit, wherein the input delta has a first magnitude and the output delta has a second magnitude, wherein the second magnitude is smaller than or equal to the first magnitude; and (c) output the output delta.

In view of above-mentioned embodiments, the jitter can be automatically compensated, thus the movement of the pointing object may more accurately correspond to the movement of the pointing device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a block diagram illustrating a pointing device according to one embodiment of the present invention.

FIG. 2 is a schematic diagram illustrating an optical mouse according to one embodiment of the present invention.

FIG. 3 is a schematic diagram illustrating magnitudes and signs of jitters, according to one embodiment of the present invention.

FIG. 4, FIG. 5, FIG. 6A, FIG. 6B, and FIG. 7 are schematic diagrams illustrating operations of the input delta processing method, according to different embodiments of the present invention.

DETAILED DESCRIPTION

Figure 5:
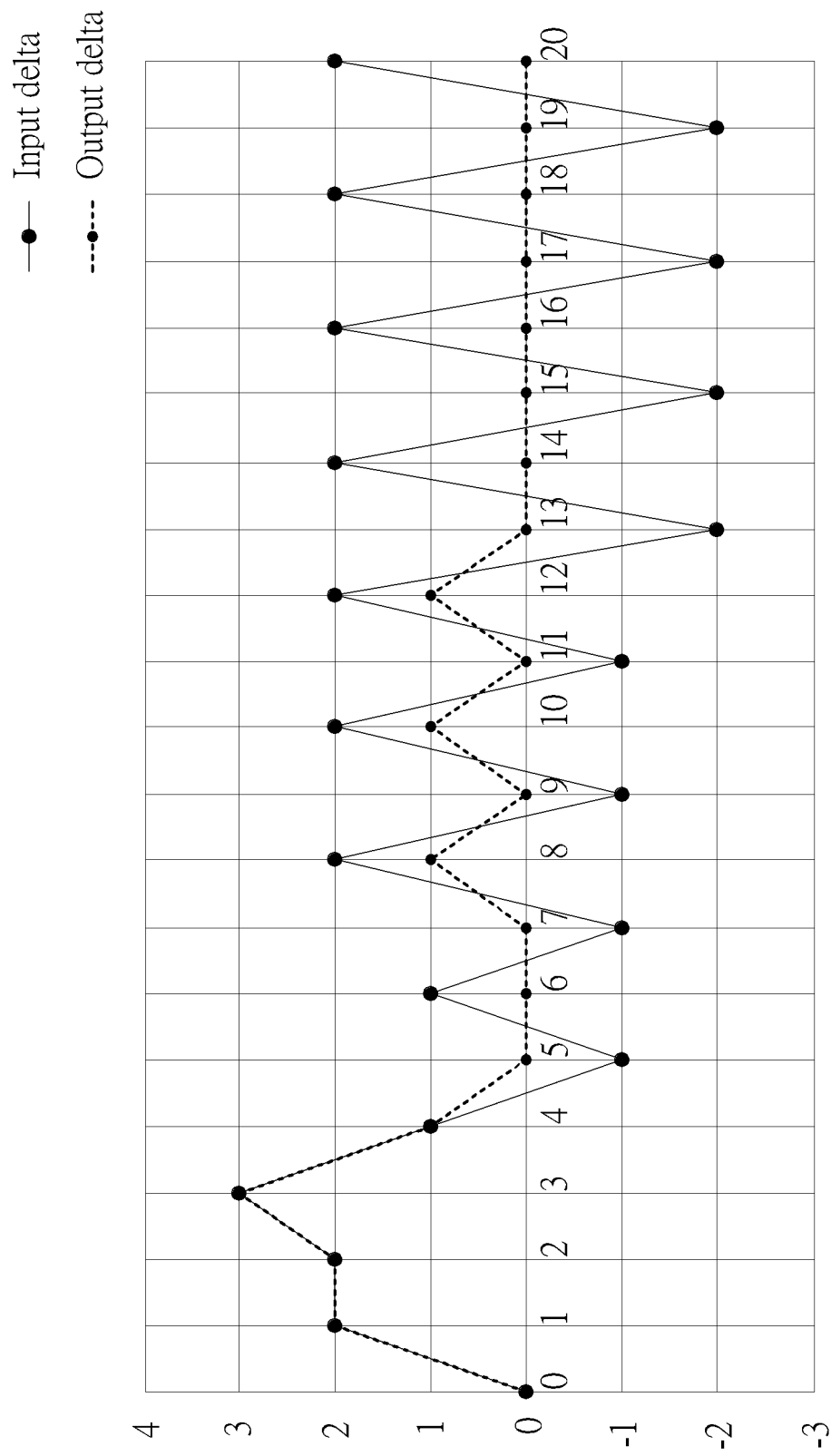

In the following descriptions, several embodiments are provided to explain the concept of the present application. It will be appreciated that the system, the device, the apparatus or the module depicted in following embodiments can be implemented by hardware (ex. circuit) or the combination of hardware and software (ex. a processing unit executing at least one program). The term "first", "second", "third" in following descriptions are only for the purpose of distinguishing different one elements, and do not mean the sequence of the elements. For example, a first device and a second device only mean these devices can have the same structure but are different devices.

FIG. 1 is a block diagram illustrating a pointing device 100 according to one embodiment of the present invention. As shown in FIG. 1, the pointing device 100 comprises a delta computing device 101 and a processing circuit 103. The delta computing device 101 is configured to generate input delta ID, wherein the input delta ID indicates supposed movement of the pointing device 100. For more detail, if the input delta ID has a value which is not zero, it is supposed the pointing device 100 has moved thus causes the input delta ID. However, the input delta ID may be above-mentioned jitters. In such case, the input delta ID has a value which is not zero even when the pointing device 100 does not move. The processing circuit 103 is configured to perform following steps to compensate jitters: (a) receiving the input delta ID from the delta computing device 101; (b) adjusting the input delta ID to generate output delta OD by the processing circuit 103, wherein the input delta ID has a first magnitude and the output delta OD has a second magnitude, wherein the second magnitude is smaller than or equal to the first magnitude; and (c) output the output delta OD. Detail operations of the processing circuit 103 will be described in following descriptions.

In following embodiments, the pointing device 100 is an optical mouse, and the delta computing device 101 is an optical sensor (e.g., an image sensor) of the optical mouse. FIG. 2 is a schematic diagram illustrating an optical mouse 200 according to one embodiment of the present invention. As shown in FIG. 2, the optical mouse 200 comprises the processing circuit 103 and an optical sensor 201. The optical sensor 201 is served as the above-mentioned delta computing device 101. Specifically, the optical sensor 201 is configured to sense a plurality of images and generates the input delta ID according to differences between images sensed by the optical sensor 201. Accordingly, the processing circuit 103 in FIG. 2 receives the input delta ID from the delta computing device 101, adjusts the input delta ID to generate the output delta OD, and outputs the output delta OD.

Please note the operation "output the output delta OD" here may mean the processing circuit 103 outputs the output delta OD to another circuit or device for further processing. However, the operation "output the output delta OD" may only mean "generate the output delta OD". In such case, the processing circuit 103 is also configured to perform following operations after the output delta OD is generated. In one embodiment, the processing circuit 201 controls the optical mouse 200 to move a cursor on a screen according to the output delta OD. Since jitters of the output delta OD are already compensated, the movement of the cursor can more accurately correspond to the movement of the optical mouse 200.

Several embodiments are provided to explain the delta compensation in following descriptions. In order to clearly explain these embodiments, some parameters are introduced in FIG. 3. FIG. 3 is a schematic diagram illustrating magnitudes and signs of deltas, according to one embodiment of the present invention. In the embodiment of FIG. 3, deltas may occur but not limited in two directions: X direction and Y direction. A "sign" means a direction of a reference point which the delta points to. For example, for the delta in the X direction, the sign is "−" if the delta points to the right of the reference point. On the opposite, for the delta in the X direction, the sign is "+" if the delta points to the left of the reference point. Following the same rule, for the delta in the Y direction, the sign is "−" if the delta points below the reference point. On the opposite, for the delta in the Y direction, the sign is "+" if the delta points up the reference point. The magnitude means an absolute value of the delta. For example, for the delta in the X direction, a delta +3 means a delta points to the left of the reference point and has a magnitude of 3. Following the same rule, for the delta in the Y direction, a delta −4 means a delta points to below of the reference point and has a magnitude of 4.

FIG. 4, FIG. 5 are schematic diagrams illustrating operations of the input delta processing method, according to one embodiment of the present invention. More specifically, FIG. 4 is a table illustrating input deltas, output deltas and signs. The table in FIG. 4 further illustrates accumulation values (ACV herein after), which will be described later. FIG. 5 is a line chart illustrating the input deltas and the output deltas illustrated in FIG. 4. In the embodiments of FIG. 4 and FIG. 5, an input delta is received and a corresponding output delta is generated after one frame is sensed except for the first frame. However, the input delta can be received and the corresponding output delta can be generated for different time periods.

In the embodiments of FIG. 4 and FIG. 5, the step of "output the output delta OD" selectively outputs 0 as the output delta OD, outputs the input delta ID as the output delta OD or outputs an adjusted delta as the output delta OD. An absolute value of the adjusted delta is smaller than an absolute value of the input delta. That is, the input delta ID may have a first magnitude and the output delta has a second magnitude smaller or equal to the first magnitude. For example, the step of "output the output delta OD" outputs 0 as the output delta OD respectively after the frames 5, 6 and 7 are sensed by the optical sensor 201. For another example, the step of "output the output delta OD" outputs the input delta ID as the output delta OD respectively after the frames 2, 3 and 4 are sensed by the optical sensor 201. For still another example, the step of "output the output delta OD" outputs the adjusted delta as the output delta OD respectively after the frames 8, and 10 are sensed by the optical sensor 201.

Figure 7:
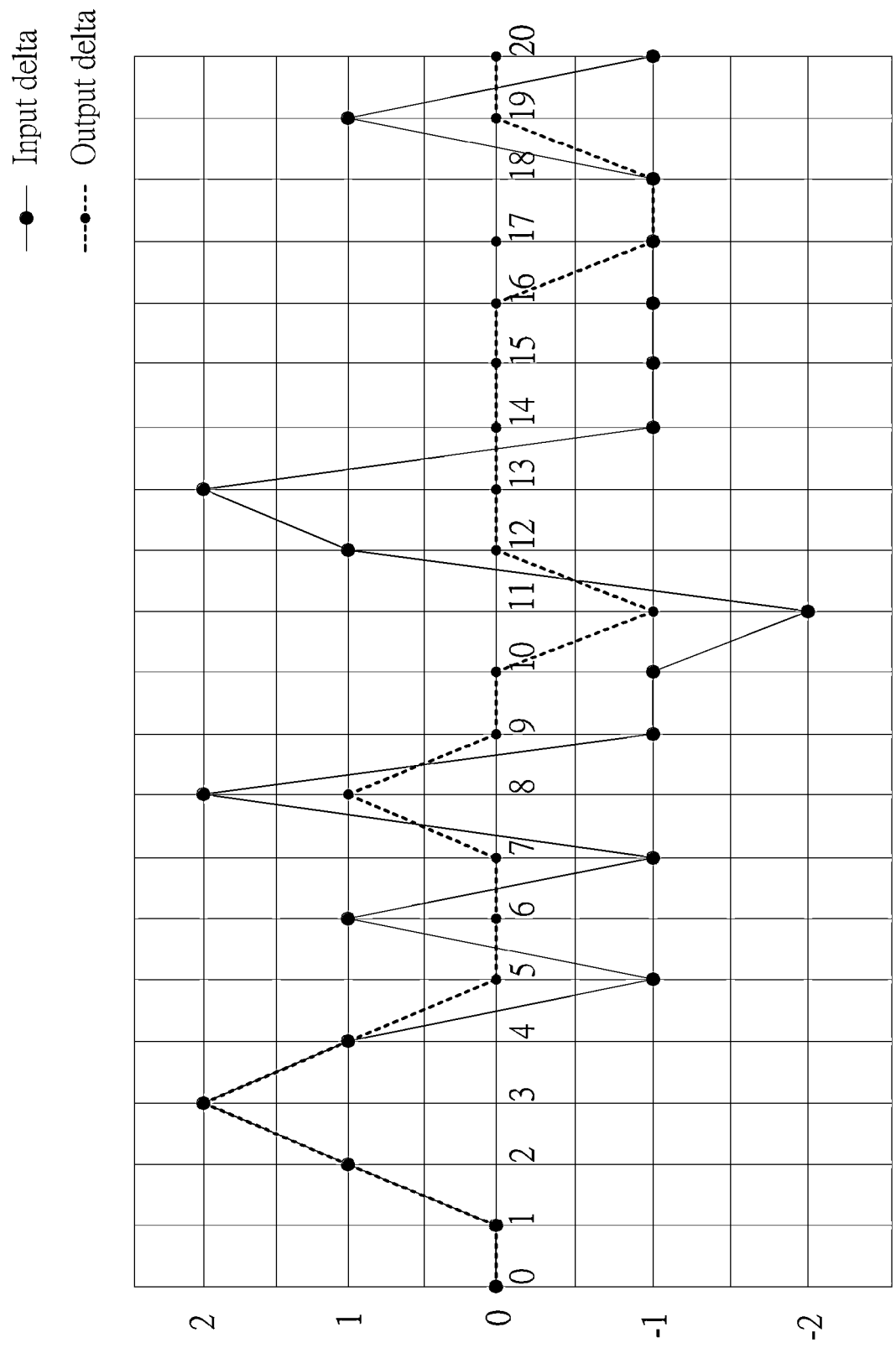

FIG. 6A, FIG. 6B, FIG. 7 are schematic diagrams illustrating operations of the input delta processing method, according to one embodiments of the present invention. More specifically, FIG. 6A, FIG. 6B are tables illustrating input deltas, output deltas and signs. The tables in FIG. 6A and FIG. 6B further illustrate ACVs. FIG. 7 is a line chart illustrating the input values and the output values illustrated in FIG. 6A. The line chart corresponding to FIG. 6B can be acquired based on the descriptions of FIG. 6A and FIG. 7, thus are omitted for brevity. In the embodiments of FIG. 6A, FIG. 6B, and FIG. 7, an input delta is received and a corresponding output delta is generated in one frame period after one frame is sensed, except for the first frame.

The rules stated in the embodiments of FIG. 4, FIG. 5 also apply to FIG. 6A, FIG. 6B, and FIG. 7. For example, the step of "output the output delta OD" outputs 0 as the output delta OD respectively after the frames 5, 6 and 7 are sensed by the optical sensor 201. For another example, the step of "output the output delta OD" outputs the input delta ID as the output delta OD respectively after the frames 2, 3 and 4 are sensed by the optical sensor 201. For still another example, the step of "output the output delta OD" outputs the adjusted delta as the output delta OD respectively after the frame 8 is sensed by the optical sensor 201. Also, the embodiment in FIG. 6B further comprises a step of "outputs an adjusted delta as the output delta OD after a sign of the output delta OD is changed". Details of this step will be described in following descriptions of FIG. 6B.

Figure 8:
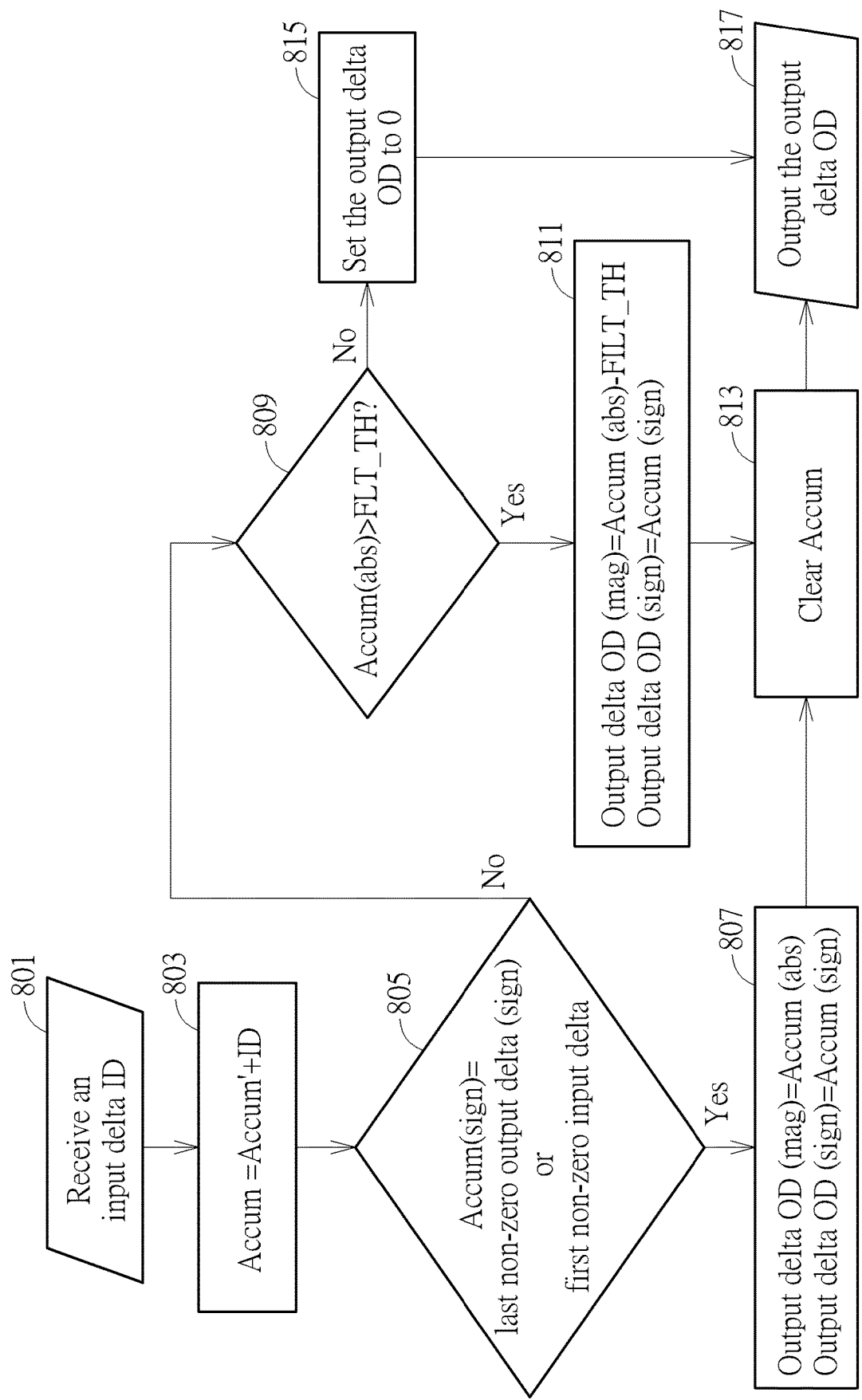
FIG. 8 is a flow chart illustrating an input delta processing method, according to one embodiment of the present invention.

The operations stated in the FIG. 4, FIG. 5, FIG. 6A, FIG. 6B, and FIG. 7 can be implemented by various steps. FIG. 8 is a flow chart illustrating an input delta processing method, according to one embodiment of the present invention. Via the steps illustrated in FIG. 8, the operations stated in the FIG. 4, FIG. 5, FIG. 6A, FIG. 6B, and FIG. 7 can be implemented. The input delta processing method illustrated in FIG. 8 comprises following steps:

Step 801

Receive an input delta ID.

Step 803

Accum=Accum'+ID.

Compute a current ACV Accum, which equals to a previous ACV Accum' plus the input delta ID.

The "ACV before output" in the embodiments of FIG. 4 and FIG. 6A, FIG. 6B means the current ACV Accum acquired in the step 803.

Step 805

Accum (sign)=last non-zero output delta (sign)

or first non-zero input delta

Determine if a sign of the current ACV Accum (sign) equals to a sign of a previous one of the output delta which is non-zero (last non-zero output delta (sign)), or if the input delta is a first one of the input delta which is non-zero, to generate a first determining result. If the first determining result is yes, go to step 807. On the contrary, if the first determining result is no, go to step 809.

After the step 805, the output delta OD is selectively set to 0, set to the input delta ID, or set to an adjusted delta according to the first determining result. Detail steps are shown in the steps 807, 809, 811, 813, and 815.

Step 807 output delta OD(mag)=Accum(abs)

output delta OD(sign)=Accum(sign)

Set a delta magnitude output delta OD (mag) of the output delta OD to an absolute value of the current ACV Accum (abs) and set a delta sign output delta OD (sign) of the output delta OD to a sign of the current ACV Accum (sign).
Step 809

Accum(abs)>FLT_TH?

Determine if the absolute value of the current ACV Accum (abs) is larger than a filtering threshold FLT_TH, to generate a second determining result.

The output delta OD is selectively set to 0, or the current ACV Accum is cleared before setting the input delta ID as the output delta OD according to the second determining result. Detail steps are illustrated in Steps 811, 813, and 815.
Step 811 output delta OD(mag)=Accum(abs)−FILT_TH output delta OD(sign)=Accum(sign)

The delta magnitude output delta OD (mag) is adjusted to the absolute value of the current ACV Accum (abs) minus the filtering threshold FILT_TH. That is, the adjusted delta of the output delta OD is set by subtracting the filtering threshold FILT_TH from the absolute value of the current ACV Accum (abs). Further, the delta sign output delta OD (sign) is updated by a sign of the current ACV Accum (sign)
Step 813
Clear the current ACV Accum.
Step 815
Set the output delta OD to 0.
Step 817
Output the output delta OD.

After the output delta OD is output, a value of the previous ACV is replaced by a value of the current ACV.

The input deltas ID and the output deltas OD stated in the embodiments of FIG. 6A, FIG. 6B, and FIG. 7 are used as examples to explain the steps illustrated in FIG. 8. For the convenience of explaining, the input delta ID and the output delta OD are named corresponding to a frame after which the input delta ID and the output delta OD are acquired. For example, the input delta ID and the output delta OD which are acquired after the frame 0 is sensed are respectively named as an input delta ID_0 and an output delta OD_0. For another example, the input delta ID and the output delta OD which are acquired after the frame 5 is sensed are respectively named as an input delta ID_5 and an output delta OD_5.

Please refer to FIG. 6A. After the frame 0 is sensed, the input delta ID_0 is 0 since only one frame is sensed. Also, an initial previous ACV Accum' is 0, thus the current ACV Accum in the step 803 (the ACV before output) is 0. Further, in the step 805, the initial sign of the current ACV Accum (sign) is "+", and the initial last non-zero output delta (sign) is also "+", thus go to step 807. In the step 807, the delta magnitude output delta OD (mag) is set to 0 and the delta sign output delta OD (sign) is set to "+", since an absolute value of the current ACV Accum (abs) is 0 and a sign of the current ACV Accum (sign) is "+". The current ACV Accum is clear to be 0 in the step 813, and then the output delta OD_0, which is 0, is output in the step 817. The "ACV after output" means the current ACV Accum after the step 817, which can be 0 or not 0, depending on if the current ACV Accum is cleared in the step 813 or not. After the frame 1 is sensed, the input delta ID_1 is still 0, thus the output delta OD_1 is still 0 following the steps 803, 805, 807, 813 and 817.

After the frame 2 is sensed, the input delta ID_2 is 1, thus the current ACV Accum in the step 803 is 1. Further, in the step 805, the input delta ID_2 is a first non-zero input delta ID, thus go to step 807. In the step 807, the delta magnitude output delta OD (mag) is set to 1 and the delta sign output delta OD (sign) is set to "+". Next, the current ACV Accum is clear to be 0 in the step 813, and then the output delta OD_2, which is 1, is output in the step 817.

After the frame 3 is sensed, the input delta ID_3 is 2, thus the current ACV Accum in the step 803 is 2. Further, in the step 805, the sign of the current ACV Accum (sign) is "+" and a sign of a previous no-zero output delta OD_2 is "+", thus go to step 807. In the step 807, the delta magnitude output delta OD (mag) is set to 2 and the delta sign output delta OD (sign) is set to "+". Next, the current ACV Accum is clear to be 0 in the step 813, and then the output delta OD_3, which is 2, is output in the step 817. After the frame 4 is sensed, input delta ID 4 is 1 and is also processed following the steps 803, 805, 807, 813, thus the output delta OD_4, which is 1, is output in the step 817.

After the frame 5 is sensed, the input delta ID_5 is −1, thus the current ACV Accum in the step 803 is −1. Further, in the step 805, the sign of the current ACV Accum (sign) is "−" but a sign of a last non-zero output delta OD_4 is "+", and the input delta ID_5 is not a first non-zero input delta, thus go to step 809. In the step 809, the absolute value of the current ACV Accum (abs), which is 1, is smaller than the filtering threshold FLT_TH, which is set to be 3 in the embodiments of FIG. 6A, FIG. 6B, FIG. 7, thus go to steps 815, 817 to output 0 as the output delta OD_5. Please note, the current ACV Accum (sign) is not cleared in this turn, thus is still −1.

After the frame 6 is sensed, the input delta ID 6 is 1, thus the current ACV Accum in the step 803 is 0. Further, in the step 805, the sign of the current ACV Accum (sign) is "+" and a sign of a previous no-zero output delta OD_4 is "+", thus go to step 809. In the step 809, the absolute value of the current ACV Accum (abs), which is 1, is smaller than the filtering threshold FLT_TH, thus go to steps 815, 817 to output 0 as the output delta OD_6.

After the frame 7 is sensed, the input delta ID_7 is −1, thus the current ACV Accum in the step 803 is −1. Further, in the step 805, the sign of the current ACV Accum (sign) is "−" but a sign of a last non-zero output delta OD_4 is "+", and the input delta ID_7 is not a first non-zero input delta, thus go to step 809. In the step 809, the absolute value of the current ACV Accum (abs), which is 1, is smaller than the filtering threshold FLT_TH, thus go to steps 815, 817 to output 0 as the output delta OD_7. The current ACV Accum (sign) is not cleared in this turn, thus is still −1.

After the frame 8 is sensed, the input delta ID 8 is 2, thus the current ACV Accum in the step 803 is 1. Further, in the step 805, the sign of the current ACV Accum (sign) is "+" and a sign of a last non-zero output delta OD_7 is "+", thus go to step 807. In the step 807, the delta magnitude output delta OD (mag) is set to 1 and the delta sign output delta OD (sign) is set to "+". Next, the current ACV Accum is clear to be 0 in the step 813, and then the output delta OD_8, which is 1, is output in the step 817. The output data OD_9 follows the same way of the output data OD_7, thus are omitted for brevity here.

After the frame 10 is sensed, the input delta ID_10 is −1, thus the current ACV Accum in the step 803 is −2. Further, in the step 805, the sign of the current ACV Accum (sign) is "−" and a sign of a previous no-zero output delta OD_8 is "+", and the input delta ID_10 is not a first non-zero input delta, thus go to step 809. In the step 809, the absolute value of the current ACV Accum (abs), which is 1, is smaller than the filtering threshold FLT_TH, thus go to steps 815, 817 to output 0 as the output delta OD_7. The current ACV Accum (sign) is not cleared in this turn, thus is still −2.

After the frame 11 is sensed, the input delta ID_11 is −2, thus the current ACV Accum in the step 803 is −4. Further, in the step 805, the sign of the current ACV Accum is "−" but a sign of a last non-zero output delta OD_8 is "+", and the input delta ID_7 is not a first non-zero input delta, thus go to step 809. In the step 809, the absolute value of the current ACV Accum (abs), which is 4, is larger than the filtering threshold FLT_TH, thus go to step 811. In the step 811, the delta magnitude output delta OD (mag) is adjusted to the absolute value Accum (abs) minus the filtering threshold FILT_TH (i.e., an adjusted delta is generated). Accordingly, the delta magnitude output delta OD (mag) is 1 in the step 811. Further, the delta sign output delta OD (sign) is updated by a sign of the current ACV Accum (sign). Therefore, the delta sign output delta OD (sign) is "−" in the step 811. Next, the current ACV Accum is cleared to be 0 in the step 813, and the output delta OD_11, which is −1, is output in the step 817.

In FIG. 6A, after the frame 12 is sensed, the input delta ID_12 is 1, thus the current ACV Accum in the step 803 is 1. Further, in the step 805, the sign of the current ACV Accum (sign) is "+" but a sign of a last non-zero output delta OD_11 is "−", and the input delta ID_12 is not a first non-zero input delta, thus go to step 809. In the step 809, the absolute value of the current ACV Accum (abs), which is 1, is smaller than the filtering threshold FLT_TH, thus go to steps 815, 817 to output 0 as the output delta OD_12. The current ACV Accum (sign) is not cleared in this turn, thus is still 1.

It will be appreciated that the output delta OD_12 may be different if the absolute value of the current ACV Accum (abs) is larger than the filtering threshold FLT_TH. Specifically, the output delta OD_12 may be the adjusted delta rather than 0. For example, in FIG. 6B, after the frame 12 is sensed, the input delta ID_12 is 4, thus the current ACV Accum in the step 803 is 4. Further, in the step 805, the sign of the current ACV Accum (sign) is "+" but a sign of a last non-zero output delta OD_11 is "−", and the input delta ID_12 is not a first non-zero input delta, thus go to step 809. In the step 809, the absolute value of the current ACV Accum (abs), which is 4, is larger than the filtering threshold FLT_TH, which is 3, thus go to step 811.

In the step 811, the delta magnitude output delta OD (mag) is adjusted to the absolute value Accum (abs) minus the filtering threshold FILT_TH. Accordingly, for FIG. 6B, the delta magnitude output delta OD (mag) is 1 in the step 811. Further, the delta sign output delta OD (sign) is updated by a sign of the current ACV Accum (sign). Therefore, the delta sign output delta OD (sign) is "+" in the step 811. Next, the current ACV Accum is cleared to be 0 in the step 813, and the output delta OD_12, which is 1, is output in the step 817.

Other output deltas in the embodiments of FIG. 6A, FIG. 6B, FIG. 7 and the embodiments of FIG. 4, FIG. 5 can be acquired based on the above-mentioned embodiments, thus are omitted for brevity here.

Figure 9:
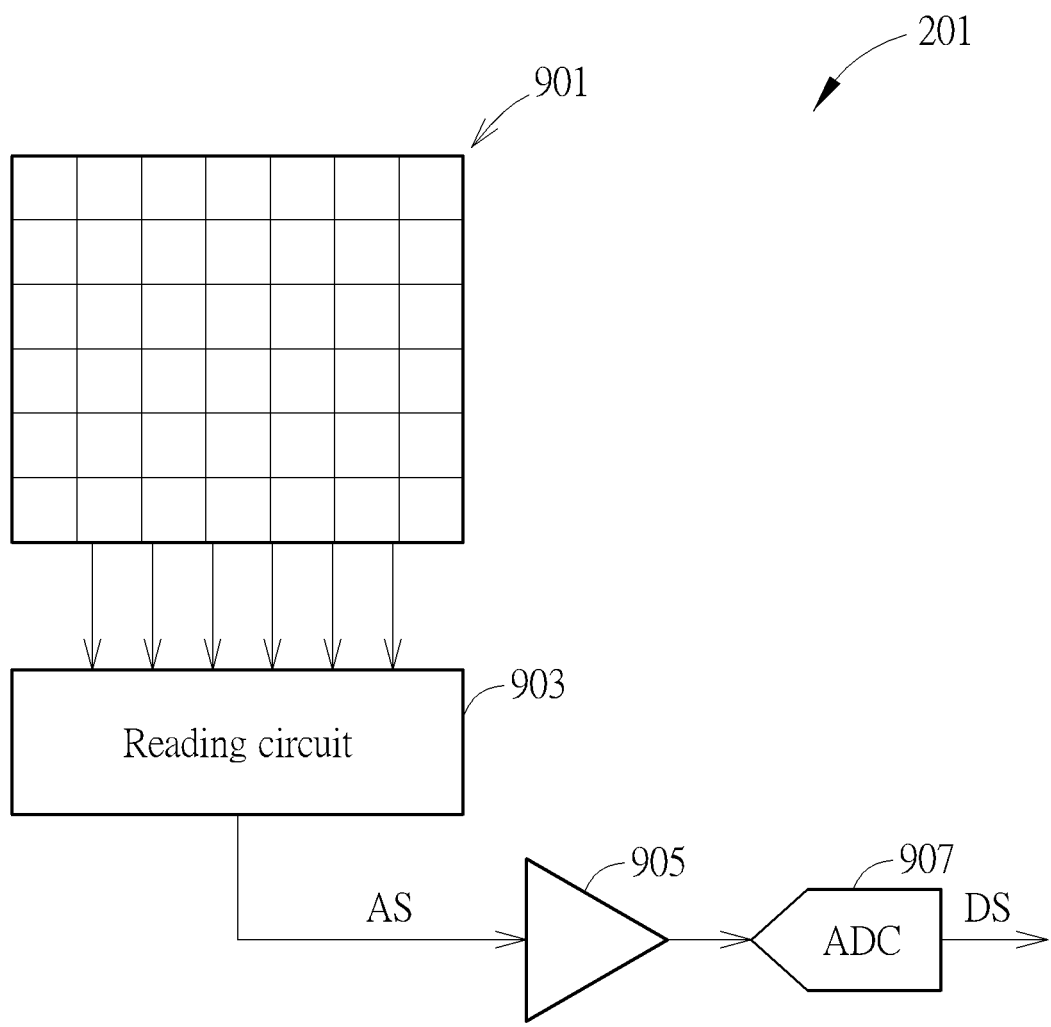
FIG. 9 is a schematic diagram illustrating different domains of the image signals, according to one embodiment of the present invention.

The above-mentioned embodiments can be performed in the analog domain or in the digital domain. FIG. 9 is a schematic diagram illustrating different domains of the image signals, according to one embodiment of the present invention. As shown in FIG. 9. the optical sensor 201 comprises a pixel array 901, a reading circuit 903, an amplifier 905 and an ADC (Analog to Digital Converter) 907. Pixel circuits in the pixel array 901 are configured to generate charges corresponding to received light. The reading circuit 903 is configured to read the charges to generate analog image signals AS. The amplifier 905, which can be removed in some embodiments is configured to generate amplified image signals. The ADC 907 is configured to convert the analog image signals AS to digital image signals DS. The above-mentioned embodiments can be performed based on the analog image signals AS or the digital image signals DS.

In another embodiment, the above-mentioned deltas can be transmitted in the analog form or in the digital form. The above-mentioned embodiments can be performed based on the deltas in the analog form or the deltas in the digital form.

Figure 10:
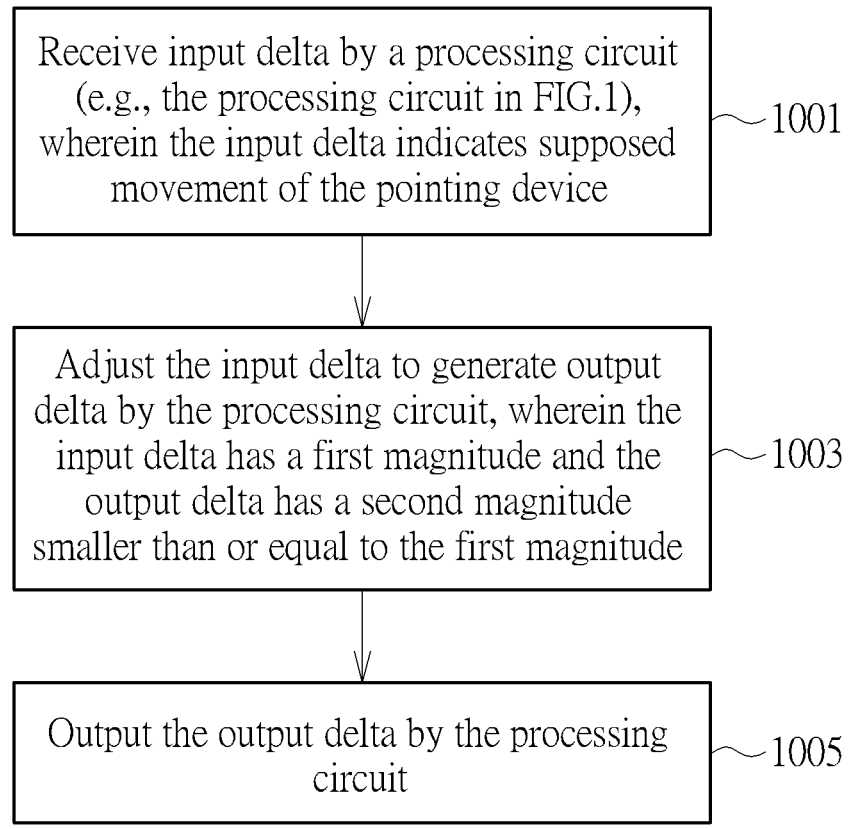
FIG. 10 is a flow chart illustrating a pointing method according to one embodiment of the present invention.

In view of above-mentioned embodiments, a pointing method can be acquired. FIG. 10 is a flow chart illustrating a pointing method according to one embodiment of the present invention. The pointing method comprises:

Step 1001

Receive input delta by a processing circuit (e.g., the processing circuit in FIG. 1), wherein the input delta indicates supposed movement of the pointing device.

Step 1003

Adjust the input delta to generate output delta by the processing circuit, wherein the input delta has a first magnitude and the output delta has a second magnitude smaller than or equal to the first magnitude.

Step 1005

Output the output delta by the processing circuit.

The pointing method can further comprise: controlling a pointing object (e.g., a cursor) according to the output delta.

In related arts, some techniques are provided to smooth the locus of movement of the pointing device. For example, an US patent with a patent number U.S. Pat. No. 7,342,088 discloses such method, which generates an accumulated value of a plurality of displacements and output the accumulated value to smooth a locus of the pointing object. However, such method could not be used when the mouse stops and could not be used to compensate jitters when the mouse is stopped, since it is based on an accumulated value which is generated according to a plurality of displacements.

In view of above-mentioned embodiments, the jitter can be automatically compensated, thus the movement of the pointing object may more accurately correspond to the movement of the pointing device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pointing method, applied to a pointing device comprising a processing circuit, comprising:
    (a) receiving input delta by the processing circuit, wherein the input delta indicates estimated movement of the pointing device;
    (b) adjusting the input delta to generate output delta by the processing circuit, wherein the input delta has a first magnitude and the output delta has a second magnitude, wherein the second magnitude is smaller than or equal to the first magnitude; and
    (c) output the output delta by the processing circuit;
    wherein the step (b) comprises:
    (b1) computing a current accumulation value, which equals to a previous accumulation value plus the input delta;

(b2) determining if a sign of the current accumulation value equals to a sign of a previous one of the output delta which is non-zero, or if the input delta is a first one of the input delta which is non-zero, to generate a first determining result;

wherein the step (b) sets the output delta according to the first determining result.

2. The pointing method of claim 1, wherein the step (c) selectively outputs 0 as the output delta, outputs the input delta as the output delta or outputs an adjusted delta as the output delta, wherein an absolute value of the adjusted delta is smaller than an absolute value of the input delta.

3. The pointing method of claim 2, wherein the step (b) comprises:

(b3) selectively sets 0 as the output delta, sets the input delta as the output delta, or sets the adjusted delta as the output delta according to the first determining result.

4. The pointing method of claim 3, wherein the step (b3) comprises:

(b31) determining if an absolute value of the current accumulation value is larger than a filtering threshold, to generate a second determining result;

(b32) selectively set 0 as the output delta, or clearing the current accumulation value before setting the input delta as the output delta according to the first determining result and the second determining result.

5. The pointing method of claim 4, wherein the step (b3) comprises:

setting a delta magnitude of the output delta by the absolute value of the current accumulation value and setting a delta sign value of the output delta by a sign of the current accumulation value, if the first determining result is yes;

going to the step (b31) after the step (b2) if the first determining result is no;

wherein the step (b3) further comprises:

(b33) updating the delta magnitude by the absolute value of the current accumulation value minus the filtering threshold; and (b34) updating the delta sign value by a sign of the current accumulation value after the step (b31).

6. The pointing method of claim 5, wherein the steps of (b33) and (b34) are performed before the step of clearing the current accumulation value.

7. The pointing method of claim 4, wherein the adjusted delta is the absolute value of the current accumulation value minus the filtering threshold.

8. The pointing method of claim 1, wherein the pointing device is an optical mouse comprising an optical sensor, wherein the optical sensor generates the input delta according to images sensed by the optical sensor.

9. A pointing device, comprising:

a delta computing device, configured to generate input delta, wherein the input delta indicates estimated movement of the pointing device; and a processing circuit, configured to perform following steps:

(a) receiving the input delta from the delta computing device;

(b) adjusting the input delta to generate output delta by the processing circuit, wherein the input delta has a first magnitude and the output delta has a second magnitude, wherein the second magnitude is smaller than or equal to the first magnitude; and (c) output the output delta;

wherein the step (b) comprises:

(b1) computing a current accumulation value, which equals to a previous accumulation value plus the input delta;

(b2) determining if a sign of the current accumulation value equals to a sign of a previous one of the output delta which is non-zero, or if the input delta is a first one of the input delta which is non-zero, to generate a first determining result;

wherein the step (b) sets the output delta according to the first determining result.

10. The pointing device of claim 9, wherein the step (c) selectively outputs 0 as the output delta, outputs the input delta as the output delta or outputs an adjusted delta as the output delta, wherein an absolute value of the adjusted delta is smaller than an absolute value of the input delta.

11. The pointing device of claim 10, wherein the step (b) comprises:

(b3) selectively sets 0 as the output delta, sets the input delta as the output delta, or sets the adjusted delta as the output delta according to the first determining result.

12. The pointing device of claim 11, wherein the step (b3) comprises:

(b31) determining if an absolute value of the current accumulation value is larger than a filtering threshold, to generate a second determining result;

(b32) selectively set 0 as the output delta, or clearing the current accumulation value before setting the input delta as the output delta according to the first determining result and the second determining result.

13. The pointing device of claim 12, wherein the step (b3) comprises:

setting a delta magnitude of the output delta by the absolute value of the current accumulation value and setting a delta sign value of the output delta by a sign of the current accumulation value, if the first determining result is yes;

going to the step (b31) after the step (b2) if the first determining result is no;

wherein the step (b3) further comprises:

(b33) updating the delta magnitude by the absolute value of the current accumulation value minus the filtering threshold; and (b34) updating the delta sign value by the current accumulation value after the step (b31).

14. The pointing device of claim 13, wherein the steps of (b33) and (b34) are performed before the step of clearing the current accumulation value.

15. The pointing device of claim 12, wherein the adjusted delta is the absolute value of the current accumulation value minus the filtering threshold.

16. The pointing device of claim 9, wherein the pointing device is an optical mouse and the delta computing device is an optical sensor, wherein the delta computing device is configured to sense images and configured to generate the input delta according to images.

* * * * *